US012583353B2

(12) United States Patent
Ha et al.

(10) Patent No.: US 12,583,353 B2
(45) Date of Patent: Mar. 24, 2026

(54) SERVER AND METHOD OF CONTROLLING THE SAME

(71) Applicants: Hyundai Motor Company, Seoul (KR); Kia Corporation, Seoul (KR)

(72) Inventors: Seungwoo Ha, Seoul (KR); Haemin Song, Seoul (KR); Yejin Song, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 673 days.

(21) Appl. No.: 18/077,888

(22) Filed: Dec. 8, 2022

(65) Prior Publication Data

US 2023/0373338 A1     Nov. 23, 2023

(30) Foreign Application Priority Data

May 18, 2022     (KR) ........................ 10-2022-0060936

(51) Int. Cl.
| | |
|---|---|
| *B60L 53/66* | (2019.01) |
| *B60L 58/12* | (2019.01) |
| *G06Q 10/02* | (2012.01) |

(52) U.S. Cl.
CPC ............... *B60L 53/66* (2019.02); *B60L 58/12* (2019.02); *G06Q 10/02* (2013.01)

(58) Field of Classification Search
CPC .......... B60L 53/66; B60L 58/12; B60L 53/57; B60L 53/67; B60L 55/00; G06Q 10/02; G06Q 10/04; Y02T 10/70; Y02T 90/12; Y02T 90/167; B60Y 2200/91

USPC ........................................................... 320/109
See application file for complete search history.

(56) References Cited

U.S. PATENT DOCUMENTS

| | | | | |
|---|---|---|---|---|
| 9,148,027 | B2 * | 9/2015 | Shane | ............... H02J 13/00024 |
| 9,413,537 | B2 * | 8/2016 | Oishi | ........................ B60L 3/12 |
| 10,040,364 | B2 * | 8/2018 | Nishi | .................... B60L 53/305 |
| 10,137,880 | B2 * | 11/2018 | Ogawa | .................. B60W 20/14 |
| 10,663,970 | B2 * | 5/2020 | Park | ...................... G05D 1/0212 |
| 11,505,079 | B2 * | 11/2022 | Ozawa | .................... B60L 58/13 |

(Continued)

FOREIGN PATENT DOCUMENTS

| | | | | |
|---|---|---|---|---|
| CA | 3154409 A1 * | 4/2021 | ............. B60L 50/66 |
| CN | 101997321 A * | 3/2011 | ............. B60L 53/65 |

(Continued)

*Primary Examiner* — M Baye Diao
(74) *Attorney, Agent, or Firm* — MORGAN, LEWIS & BOCKIUS LLP

(57) ABSTRACT

A server for determining a charge order among vehicles requiring charging based on at least one of state of charge (SoC) information and reservation information when a charger for a vehicle is insufficient and informing the vehicles of the charge order, and a method of controlling the same, includes a communicator configured to fluidically-communicate with a plurality of vehicles and a plurality of chargers and a controller operatively connected to the communicator and configured to determine a charge order among the first vehicles based on at least one of SoC information of each of the first vehicles and reservation information of each of the first vehicles when the number of a plurality of first vehicles including an SoC lower than or equal to a target SoC among the vehicles is greater than the number of first chargers in a chargeable state among the plurality of chargers.

20 Claims, 10 Drawing Sheets

FIG. 2

(56) References Cited

U.S. PATENT DOCUMENTS

| | | | |
|---|---|---|---|
| 2013/0181672 A1 | 7/2013 | Egoshi | |
| 2015/0329005 A1* | 11/2015 | Oishi | B60L 53/00 |
| | | | 701/22 |
| 2018/0241229 A1* | 8/2018 | Kitaoka | B60L 53/63 |
| 2019/0204840 A1* | 7/2019 | Park | G01C 21/3667 |
| 2020/0207235 A1* | 7/2020 | Ozawa | B60L 53/51 |
| 2021/0110323 A1* | 4/2021 | Munoz | G06Q 10/06311 |
| 2021/0170903 A1* | 6/2021 | Tsuchiya | B60L 58/16 |
| 2022/0105828 A1* | 4/2022 | Matsushita | G01R 31/367 |

FOREIGN PATENT DOCUMENTS

| | | | | |
|---|---|---|---|---|
| CN | 106183843 A | * | 12/2016 | B60L 53/65 |
| CN | 110015101 B | * | 5/2021 | B60L 53/60 |
| JP | 2014122463 A | * | 7/2014 | E04H 6/42 |
| JP | 2021040373 A | | 3/2021 | |
| JP | 2021110993 A | | 8/2021 | |
| JP | 2021117506 A | | 8/2021 | |
| KR | 10-2014-0109568 A | | 9/2014 | |
| KR | 10-2021-0046479 A | | 4/2021 | |
| KR | 10-2021-0057231 A | | 5/2021 | |

* cited by examiner

FIG. 3

| VEHICLE NUMBER | NEXT RESERVATION TIME | CURRENT SoC | USAGE STATE |
|---|---|---|---|
| 1 | NaN | 60% | PARTICIPATING IN V2G |
| 2 | 2021-12-31-15:00 | 50% | DRIVING |
| 3 | 2021-12-31-13:00 | 43% | DRIVING |
| 4 | NaN | 70% | STAND-BY |
| ... | ... | ... | ... |

RESERVATION INFORMATION      VEHICLE STATE INFORMATION

FIG. 4

| VEHICLE NUMBER | NEXT RESERVATION TIME | CURRENT SoC | USAGE STATE |
|---|---|---|---|
| 3 | 2021-12-31-13:00 | 43% | DRIVING |
| 2 | 2021-12-31-15:00 | 50% | DRIVING |
| 8 | 2021-12-31-12:00 | 51% | DRIVING |
| 12 | 2021-12-31-12:30 | 53% | DRIVING |
| 5 | 2021-12-31-13:00 | 30% | DRIVING |
| 8 | 2021-12-31-15:00 | 32% | DRIVING |
| 9 | 2021-12-31-12:00 | 38% | DRIVING |
| 13 | 2021-12-31-12:30 | 37% | DRIVING |

FIRST VEHICLE (REQUIRING CHARGING)

FIG. 5

| ITEMS | VALUE |
|---|---|
| TOTAL NUMBER OF CHARGERS | 20 |
| NUMBER OF VEHICLES PARTICIPATING IN V2G | 17 |
| NUMBER OF REMAINING CHARGERS (FIRST CHARGERS) | 3 |

FIG. 6

| VEHICLE NUMBER | NEXT RESERVATION TIME | CURRENT SoC | USAGE STATE |
|---|---|---|---|
| 5 | 2021-12-31-13:00 | 30% | DRIVING |
| 8 | 2021-12-31-15:00 | 32% | DRIVING |
| 13 | 2021-12-31-12:30 | 37% | DRIVING |
| 9 | 2021-12-31-12:00 | 38% | DRIVING |

FIRST VEHICLE (REQUIRING CHARGING)

SECOND VEHICLE (CHARGING)

THIRD VEHICLE (GENERAL PARKING)

| VEHICLE NUMBER | NEXT RESERVATION TIME | CURRENT SoC | USAGE STATE | |
|---|---|---|---|---|
| 9 | 2021-12-31-12:00 | 38% | DRIVING | FIRST VEHICLE (REQUIRING CHARGING) |
| 13 | 2021-12-31-12:30 | 37% | DRIVING | SECOND VEHICLE (CHARGING) |
| 5 | 2021-12-31-13:00 | 30% | DRIVING | |
| 8 | 2021-12-31-15:00 | 32% | DRIVING | THIRD VEHICLE (GENERAL PARKING) |

FIG. 8

| VEHICLE NUMBER | NEXT RESERVATION TIME (WEIGHT) | CURRENT SoC (WEIGHT) | USAGE STATE |
|---|---|---|---|
| 5 | 2021-12-31-13:00 (2) | 30% (4) | DRIVING |
| 13 | 2021-12-31-12:30 (3) | 37% (2) | DRIVING |
| 9 | 2021-12-31-12:00 (4) | 38% (1) | DRIVING |
| 8 | 2021-12-31-15:00 (1) | 32% (3) | DRIVING |

FIRST VEHICLE (REQUIRING CHARGING)

SECOND VEHICLE (CHARGING)

THIRD VEHICLE (GENERAL PARKING)

FIG. 9

| ITEMS | | CONTENTS |
|---|---|---|
| FIRST VEHICLE (REQUIRING CHARGING) | SECOND VEHICLE (CHARGING) | TRANSMIT MESSAGE WHICH INFORMS CONNECTION TO CHARGER |
| | THIRD VEHICLE (GENERAL PARKING) | TRANSMIT MESSAGE WHICH INFORMS GENERAL PARKING |

SERVER AND METHOD OF CONTROLLING THE SAME

CROSS-REFERENCE TO RELATED APPLICATION

The present application claims priority to Korean Patent Application No. 10-2022-0060936, filed on May 18, 2022, the entire contents of which is incorporated herein for all purposes by this reference.

BACKGROUND OF THE PRESENT DISCLOSURE

Field of the Present Disclosure

The present disclosure relates to a server for operating a vehicle to grid (V2G) system and a method of controlling the same.

Description of Related Art

A vehicle to grid (V2G) system is a system using a technology for connecting an electric vehicle (EV) to a building to use the electric vehicle as an energy storage device. In other words, the V2G system may maintain a state of charge (SOC) value of a battery of the electric vehicle using a target SoC, and when the SOC value of the battery of the electric vehicle is higher than the target SoC, the battery of the electric vehicle is discharged to charge a battery of the building to generate a profit.

As described above, the V2G system may repeatedly charge and discharge the battery of the electric vehicle to generate the profit, and electric vehicles participating in the V2G system are not charged in 100% SoC, so that a situation in which the SoC is often insufficient compared to general electric vehicles may occur.

There is no problem when there are enough chargers for charging the electric vehicles participating in the V2G system, but when the chargers are insufficient, there is a demand for a system which may efficiently charge and manage the electric vehicles participating in the V2G system.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a server for determining a charge order among vehicles requiring charging based on at least one of state of charge (SoC) information and reservation information when a charger for a vehicle is insufficient and inform the vehicle of the charge order, and a method of controlling the same.

Additional aspects of the present disclosure will be set forth in part in the description which follows, and in part, will be obvious from the description, or may be learned by practice of the present disclosure.

In accordance with one aspect of the present disclosure, a server includes a communicator configured to communicate with a plurality of vehicles and a plurality of chargers and a controller operatively connected to the communicator and configured to determine a charge order among the first vehicles based on at least one of SoC information of each of the first vehicles and reservation information of each of the first vehicles based on a number of the plurality of first vehicles including an SoC lower than or equal to a target SoC among the plurality of vehicles, which is greater than the number of the first chargers in a chargeable state among the plurality of chargers.

The controller may be configured to determine the charge order among the plurality of first vehicles so that the lower the SoC is, the higher the charge order is.

The controller may be configured to determine the charge order among the plurality of first vehicles so that the earlier a next reservation time according to the reservation information is, the higher the charge order is.

The controller may allocate a higher first weight, as the SoC is lower, to each of the first vehicles, allocate a higher second weight, as a next reservation time according to the reservation information is earlier, to each of the first vehicles, and determine the charge order among the plurality of first vehicles based on the first weight and the second weight.

The controller may be configured to control the communicator to transmit a message, which informs a connection to the charger, to at least one of a second vehicle to be charged among the plurality of first vehicles based on the determined charge order and a user terminal of a driver of the second vehicle.

The controller may be configured to control the communicator to transmit a message, which informs general parking, to at least one of a third vehicle which is not a charge target among the plurality of first vehicles based on the determined charge order and a user terminal of a driver of the third vehicle.

The controller may be configured to determine the plurality of first vehicles among the plurality of vehicles based on vehicle state information of each of the vehicles received through the communicator, and the vehicle state information may include at least one of the SoC information and usage state information.

The controller may be configured to determine at least one fourth vehicle, connected to the charger, among the plurality of vehicles based on the usage state information of each of the vehicles and determine a number of the first chargers in a chargeable state based on a number of the plurality of chargers and a number of the at least one fourth vehicle.

The controller may be configured to control the communicator to transmit a message, which informs a connection to the charger, to at least one of the plurality of first vehicles and user terminals of drivers of the plurality of first vehicles based on the number of the first vehicles which is smaller than the number of the first chargers.

The controller may be configured to control the communicator to transmit a message, which informs a connection to the charger, to at least one of a returning vehicle returning to a parking space where the plurality of chargers are provided among the plurality of first vehicles and a user terminal of a driver of the returning vehicle.

In accordance with another aspect of the present disclosure, a method of controlling a server including a communicator configured to communicate with a plurality of vehicles and a plurality of chargers includes determining a charge order among a plurality of first vehicles based on at least one of SoC information of each of the first vehicles and reservation information of each of the first vehicles based on a number of the plurality of first vehicles including an SoC lower than or equal to a target SoC, which is greater than a number of first chargers in a chargeable state among the plurality of chargers.

The determining of the charge order among the plurality of first vehicles may include determining the charge order among the plurality of first vehicles so that the lower the SoC is, the higher the charge order is.

The determining of the charge order among the plurality of first vehicles may include determining the charge order among the plurality of first vehicles so that the earlier a next reservation time according to the reservation information is, the higher the charge order is.

The determining of the charge order among the plurality of first vehicles may include allocating a higher first weight, as the SoC is lower, to each of the first vehicles, allocating a higher second weight, as a next reservation time according to the reservation information is earlier, to each of the first vehicles, and determining the charge order among the plurality of first vehicles based on the first weight and the second weight.

The method may further include controlling the communicator to transmit a message, which informs a connection to the charger, to at least one of a second vehicle to be charged among the plurality of first vehicles based on the determined charge order and a user terminal of a driver of the second vehicle.

The method may further include controlling the communicator to transmit a message, which informs general parking, to at least one of a third vehicle which is not a charge target among the plurality of first vehicles based on the determined charge order and a user terminal of a driver of the third vehicle.

The method may further include determining the plurality of first vehicles among the plurality of vehicles based on vehicle state information of each of the vehicles received through the communicator, wherein the vehicle state information includes at least one of the SoC information and usage state information.

The method may further include determining at least one fourth vehicle connected to the charger among the plurality of vehicles based on the usage state information of each of the vehicles and determining a number of the first chargers in a chargeable state based on a number of the plurality of chargers and a number of the at least one fourth vehicle.

The method may further include controlling the communicator to transmit a message, which informs a connection to the charger, to at least one of the plurality of first vehicles and user terminals of drivers of the plurality of first vehicles based on the number of the plurality of first vehicles which is smaller than the number of the first chargers.

The controlling of the communicator to transmit the message, which informs the connection to the charger, may include controlling the communicator to transmit a message, which informs a connection to the charger, to at least one of a returning vehicle returning to a parking space where the plurality of chargers are provided among the plurality of first vehicles and a user terminal of a driver of the returning vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 shows one example of operating tables of vehicles managed by a server according to an exemplary embodiment of the present disclosure;

FIG. 4 shows one example in which the server according to an exemplary embodiment determines a plurality of first vehicles including a target state of charge (SoC) or less;

FIG. 5 is a view for describing a case in which the server according to an exemplary embodiment identifies the remaining chargers;

FIG. 6 shows one example in which the server according to an exemplary embodiment determines a charge order among first vehicles according to an SoC;

FIG. 8 shows one example in which the server according to an exemplary embodiment determines a charge order among the first vehicles according to the SoC and the next reservation time;

FIG. 9 is a view for describing a case in which the server according to an exemplary embodiment informs drivers of a connection to the charger or general parking.

Figure 1:
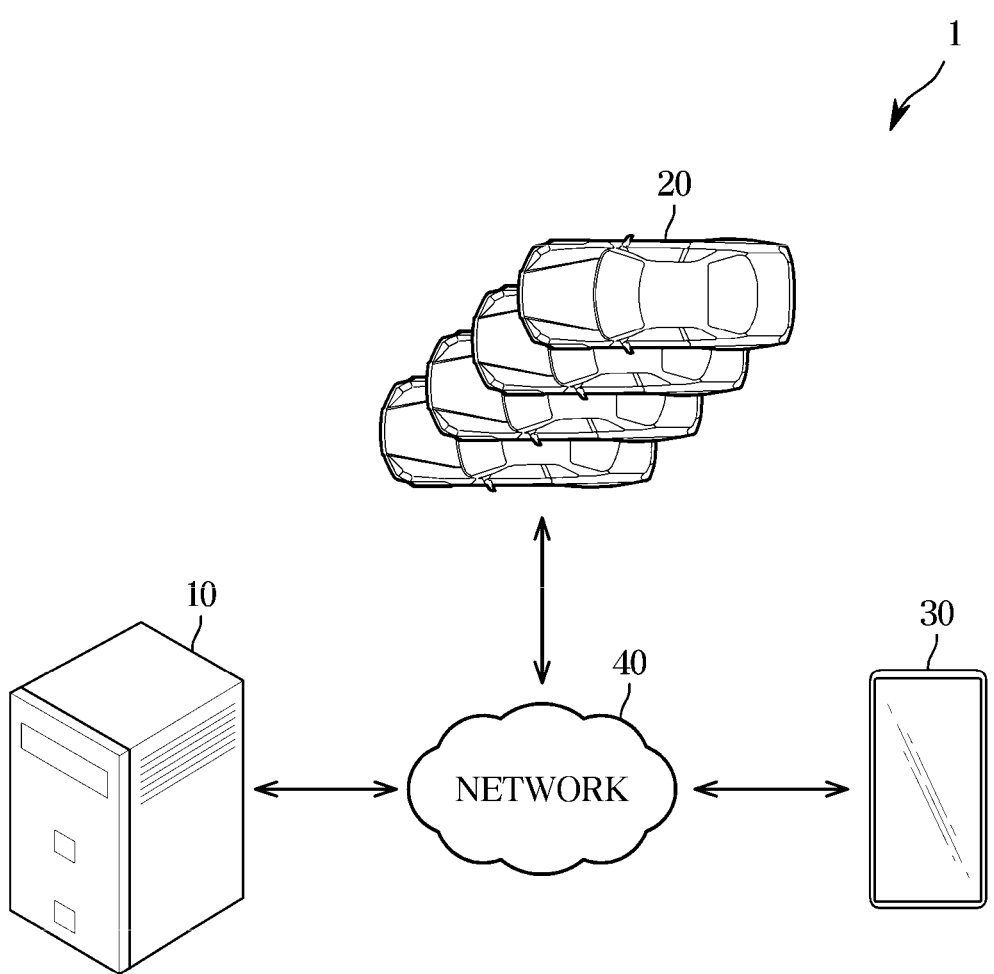
FIG. 1 shows a vehicle to grid (V2G) system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The same reference numerals indicate the same components throughout the specification. The specification does not describe all elements of the embodiments, and general contents in the art to which the present disclosure pertains or contents overlapping between the exemplary embodiments will be omitted.

Throughout the specification, when a certain portion is referred to as being "connected" to another portion, this includes not only a case in which the certain portion is directly connected to another portion but also a case in which the certain portion is indirectly connected thereto, and the indirect connection includes connection through a wireless communication network.

In addition, when a certain portion is referred to as "including" a certain component, this means that the certain portion may further include other components rather than precluding other components unless otherwise stated.

The singular expression includes the plural expression unless the context clearly states otherwise.

Furthermore, terms such as "~unit," "~group," "~block," "~member," and "~module" may each mean a unit of processing at least one function or operation. For example, the terms may mean at least one process processed by at least one hardware such as a field-programmable gate array (FPGA)/an application specific integrated circuit (ASIC), at least one software stored in a memory, or a processor.

The signs attached to each operation are used to identify each operation, and these signs do not indicate the order among the operations, and each operation is performed differently from the stated order unless the context clearly indicates a specific order.

Hereinafter, embodiments of a server and a method of controlling the same according to one aspect will be described in detail with reference to the accompanying drawings.

FIG. 1 shows a vehicle to grid (V2G) system according to an exemplary embodiment of the present disclosure.

Referring to FIG. 1, a V2G system 1 according to various exemplary embodiments of the present disclosure may include a server 10 for operating a V2G system 1, a plurality of vehicles 20 participating in the V2G system 1, and a user terminal 30 of a driver of the vehicle 20.

The V2G system 1 is a system using a technology which connects an electric vehicle and a building to use the vehicle as an energy storage device, and may discharge power of the electric vehicle to use the discharged power as power of the building when power charged in the electric vehicle is sufficient to generate a profit.

To the present end, the V2G system 1 includes the plurality of vehicles 20 and a plurality of chargers which may charge the vehicle 20 or transmit power discharged from the vehicle 20 to the building.

The server 10 according to various exemplary embodiments of the present disclosure may receive vehicle state information including state of charge (SoC) information and usage state information from the vehicle 20 included in the V2G system 1 and schedule the charging and discharging of each vehicle 20 based on the vehicle state information so that the V2G system 1 may be operated.

For example, the server 10 may correspond to a management server of a fleet company such as a rental vehicle company or a shared vehicle platform company, and determine a charge order among the vehicles 20 requiring charging based on at least one of the SoC information and reservation information of each vehicle 20.

The vehicle 20 according to various exemplary embodiments of the present disclosure may correspond to an electric vehicle including a motor and a battery configured for supplying power to the motor. However, the vehicle 20 may also be a hybrid vehicle further including an engine in various exemplary embodiments of the present disclosure.

The user terminal 30 according to various exemplary embodiments of the present disclosure may be a driver's terminal of the vehicle 20. For example, the user terminal 30 may be a terminal of a user who utilizes a service of a fleet company.

The user may reserve the use of the vehicle 20 through the user terminal 30, and the server 10 may receive reservation information of the vehicle 20 from the user terminal 30. However, the reservation information is not input only through the user terminal 30 and may also be directly input by a terminal of a service provider connected to the server 10 according to the embodiment.

Furthermore, the user terminal 30 may receive a message which informs the user of a connection to the charger or a general parking of the vehicle 20 from the server 10 and output the informed message to the user.

At the present time, the server 10, the vehicle 20, and the user terminal 30 may mutually transmit or receive data through a network 40.

The V2G system 1 has been briefly described above. Hereinafter, the server 10 of the V2G system 1 will be described in detail.

Figure 2:
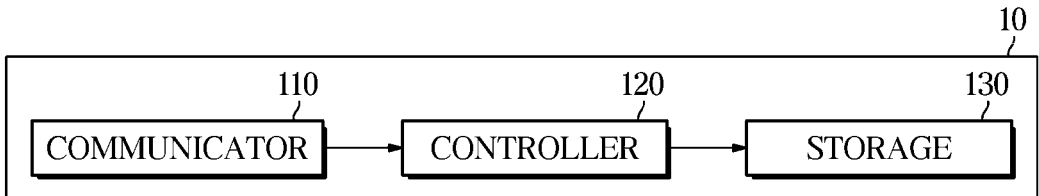
FIG. 2 is a control block diagram of a server according to an exemplary embodiment of the present disclosure.

FIG. 2 is a control block diagram of the server 10 according to an exemplary embodiment of the present disclosure.

Referring to FIG. 2, the server 10 according to an exemplary embodiment includes a communicator 110, a controller 120 for selecting the vehicle 20 requiring charging among the plurality of vehicles 20 and determine a charge order among the selected vehicles 20, and a storage 130 for storing various types of information required for control.

However, the control block diagram of the server 10 shown in FIG. 2 corresponds to one example, and according to the exemplary embodiment of the present disclosure, a component other than components shown in FIG. 2 may be further added, or some of the components shown in FIG. 2 may also be omitted.

The communicator 110 according to various exemplary embodiments of the present disclosure may be connected to the network 40 to transmit or receive data to or from the vehicle 20 or the user terminal 30. To the present end, the communicator 110 may be provided as a known type of wired communication module, wireless communication module, or wired and wireless communication module.

The controller 120 according to various exemplary embodiments of the present disclosure may select the vehicle 20 requiring charging among the plurality of vehicles 20 included in the V2G system 1 and determine the charge order among the selected vehicles 20.

The controller 120 may determine a plurality of first vehicles including an SoC lower than or equal to a target SoC among the plurality of vehicles 20 based on vehicle state information of each of the vehicles 20 received through the communicator 110.

In other words, the controller 120 may determine vehicles (the first vehicles) requiring charging among the plurality of vehicles 20 based on the SoC information of the vehicle state information.

At the present time, when the number of the plurality of first vehicles is greater than the number of the at least one first charger in a chargeable state among the plurality of chargers included in the V2G system 1, the controller 120 may determine the charge order among the plurality of first vehicles based on at least one of the SoC information of each of the first vehicles or reservation information of each of the first vehicles.

For example, in various exemplary embodiments of the present disclosure, the controller 120 may determine a charge order among the plurality of first vehicles so that the lower the SoC is, the higher the charge order is.

Furthermore, in various exemplary embodiments of the present disclosure, the controller 120 may determine a charge order among the plurality of first vehicles so that the earlier the next reservation time according to the reservation information, the higher the charge order.

Furthermore, in various exemplary embodiments of the present disclosure, the controller 120 may allocate a higher first weight to each of the first vehicles as the SoC is lower, allocate a higher second weight to each of the first vehicles as a next reservation time according to the reservation information is earlier, and determine a charge order among the plurality of first vehicles based on the first weight and the second weight.

The controller 120 according to various exemplary embodiments of the present disclosure may control the communicator 110 to transmit a message, which informs a connection to the charger, to at least one of a second vehicle to be charged among the plurality of first vehicles based on the determined charge order and the user terminal 30 of a driver of the second vehicle.

The controller 120 according to various exemplary embodiments of the present disclosure may control the communicator 110 to transmit a message, which informs general parking, to at least one of a third vehicle which is not a charge target among the plurality of first vehicles based on the determined charge order and the user terminal 30 of a driver of the third vehicle.

In other words, the controller 120 may determine that a plurality of second vehicles to be connected to the chargers correspond to the number of remaining chargers among the first vehicles requiring charging and determine that vehicles excluding the second vehicles among the first vehicles are the third vehicles which are general parking targets.

In the instant case, the vehicle state information may include at least one of the SoC information and the usage state information, wherein the SoC information may indicate an SOC value of a battery of the vehicle 20, and the usage state information may indicate whether a corresponding vehicle 20 is traveling parking, or participating in V2G system (in a state of being connected to the charger).

In various exemplary embodiments of the present disclosure, the controller 120 may determine at least one fourth vehicle connected to the charger among the plurality of vehicles 20 based on the usage state information of the vehicle state information of each of the vehicles 20 and determine the number of the first chargers (remaining chargers) in a chargeable state by subtracting the number of fourth vehicles from the number of the plurality of chargers in the V2G system 1. However, in various exemplary embodiments of the present disclosure, the controller 120 may determine the number of the first chargers (remaining chargers) in a chargeable state by receiving information on whether to connect to the vehicle 20 from the plurality of chargers.

When the number of the plurality of first vehicles requiring charging is smaller than the number of the first chargers corresponding to the remaining chargers, the controller 120 according to various exemplary embodiments of the present disclosure may control the communicator 110 to transmit a message, which informs a connection to the charger, to at least one of the plurality of first vehicles and the user terminals 30 of the drivers of the plurality of first vehicles.

In other words, when the number of the remaining chargers are more than the number of the vehicles 20 requiring charging, the controller 120 may inform all vehicles 20 requiring charging of a connection to the charger.

At the present time, according to the exemplary embodiment of the present disclosure, the controller 120 may control the communicator 110 to transmit the message, which informs the connection to the charger, to at least one of a returning vehicle returning to a parking space where the plurality of chargers are provided among the plurality of first vehicles and the user terminal 30 of a driver of the returning vehicle.

In other words, when the vehicle 20 requiring charging returns to the parking space where the chargers are provided, the controller 120 may inform the driver of the returning vehicle 20 of the connection to the charger.

The controller 120 may include at least one memory in which a program for performing the above-described operation and an operation to be described below is stored and at least one processor for executing the stored program. When a plurality of memories and processors are provided, the plurality of memories and processors may be integrated as one chip or may also be provided in physically separate positions.

The storage 130 according to various exemplary embodiments of the present disclosure may store various types of information necessary for control, and store, for example, operating tables of the vehicle 20 included in the V2G system 1, charger information (the number of all chargers and the like) included in the V2G system 1, operation information (target SoC and the like) of the V2G system 1, and the like. To the present end, the storage 130 may be provided as a known type of storage medium.

Each component of the server 10 has been described above. Hereinafter, it will be described in detail that the server 10 determines a charge order among the vehicles 20 requiring charging.

Figure 7:
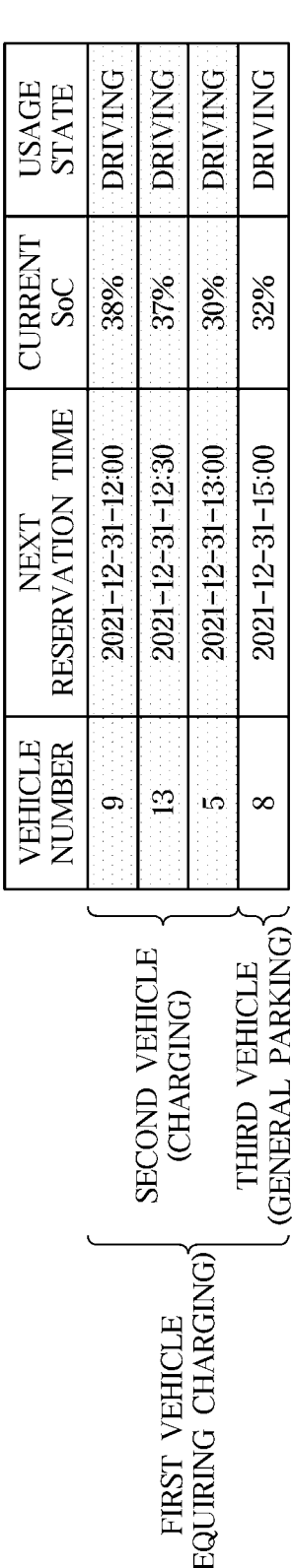
FIG. 7 shows one example in which the server according to an exemplary embodiment determines a charge order among the first vehicles according to a next reservation time.

FIG. 3 shows one example of operating tables of vehicles managed by the server 10 according to an exemplary embodiment of the present disclosure, FIG. 4 shows one example in which the server 10 according to an exemplary embodiment determines a plurality of first vehicles including a target SoC or less, FIG. 5 is a view for describing a case in which the server 10 according to an exemplary embodiment identifies the remaining chargers, FIG. 6 shows one example in which the server 10 according to an exemplary embodiment determines a charge order among first vehicles according to an SoC, FIG. 7 shows one example in which the server 10 according to an exemplary embodiment determines a charge order among the first vehicles according to a next reservation time, and FIG. 8 shows one example in which the server 10 according to an exemplary embodiment determines a charge order among the first vehicles according to the SoC and the next reservation time.

Referring to FIG. 3, the server 10 according to various exemplary embodiments of the present disclosure may store operating tables of each of the vehicles 20 included in the V2G system 1 and update the operating tables in a unit of a certain time.

The operating table of each of the vehicles 20 includes vehicle state information including current SoC information and usage state information of the vehicle 20 and includes a next reservation time corresponding to the reservation information of the vehicle 20.

As described above, the vehicle state information may include at least one of the SoC information and the usage state information, wherein the SoC information may indicate an SOC value of a battery of a corresponding vehicle 20, and the usage state information may indicate whether the vehicle 20 is driving, parking, or participating in the V2G (in a state of being connected to the charger).

Furthermore, the reservation information may be information on a service user's reservation for the plurality of vehicles 20 included in the V2G system 1, and may indicate that a corresponding vehicle 20 will start to drive at a next reservation time. For example, the server 10 may receive reservation information from the user terminal 30 of the service user or receive reservation information through the terminal of the service provider.

The server 10 according to various exemplary embodiments of the present disclosure may select the vehicle 20 requiring charging among the plurality of vehicles 20 included in the V2G system 1 and determine a charge order among the selected vehicles 20.

As shown in FIG. 4, the server 10 may determine the plurality of first vehicles including an SoC lower than or equal to a target SoC (e.g., 40%) among the plurality of vehicles 20 based on the vehicle state information of each of the vehicles 20 received through the communicator 110.

In other words, the server 10 may determine the vehicle (the first vehicle) requiring charging among the plurality of vehicles 20 based on the SoC information of the vehicle state information.

Thereafter, the server 10 may determine the number of first chargers (remaining chargers) in a chargeable state based on the usage state information of the vehicle state information.

In other words, in various exemplary embodiments of the present disclosure, the server 10 may determine at least one fourth vehicle connected to the charger among the plurality of vehicles 20 based on the usage state information of the vehicle state information of each of the vehicles 20 and determine the number of first chargers (remaining chargers) in a chargeable state by subtracting the number of fourth vehicles from the number of the plurality of chargers in the V2G system 1.

As shown in FIG. 5, the server 10 may identify the number of remaining chargers (first chargers) (e.g., 3) by subtracting the number of the vehicles 20 (e.g., 17) participating in the V2G from the total number of chargers (e.g., 20) included in the V2G system 1.

However, in various exemplary embodiments of the present disclosure, the server 10 may determine the number of first chargers (remaining chargers) in the chargeable state by receiving information on whether to connect to the vehicle 20 from the plurality of chargers.

At the present time, when the number of the plurality of first vehicles is greater than the number of one or more first chargers in the chargeable state among the plurality of chargers included in the V2G system 1, the server 10 may determine a charge order among the plurality of first vehicles based on at least one of the SOC value of each of the first vehicles and the reservation information of each of the first vehicles.

For example, as shown in FIGS. 6 to 8, the server 10 may determine that only a plurality of vehicles corresponding to the number of first chargers in the chargeable state in an order of the highest charge order among the plurality of first vehicles requiring charging are the second vehicles which are the vehicles to be charged and determine that vehicles excluding the second vehicles among the plurality of first vehicles are the third vehicles which are general parking targets.

According to the exemplary embodiment of the present disclosure, the server 10 may determine a charge order among the plurality of first vehicles so that the lower the SoC is, the higher the charge order is.

For example, as shown in FIG. 6, the server 10 may determine that a plurality of first vehicles (e.g., vehicle numbers 5, 8, and 13) corresponding to the number of first chargers (e.g., 3) in an order of the lowest SoC among the plurality of first vehicles are the second vehicles which are the vehicles to be charged. At the instant time, the server 10 may determine that the remaining vehicle (e.g., vehicle number 9) excluding the second vehicles among the plurality of first vehicles is the third vehicle which is a general parking target.

Furthermore, in various exemplary embodiments of the present disclosure, the server 10 may determine a charge order among the plurality of first vehicles so that the earlier the next reservation time according to the reservation information, the higher the charge order.

For example, as shown in FIG. 7, the server 10 may determine that a plurality of first vehicles (e.g., vehicle numbers 9, 13, and 5) corresponding to the number of first chargers (e.g., 3) in an order of the earliest next reservation time among the plurality of first vehicles are the second vehicles which are the vehicles to be charged. At the instant time, the server 10 may determine that the remaining vehicle (e.g., vehicle number 8) excluding the second vehicles among the plurality of first vehicles is the third vehicle which is a general parking target.

Furthermore, in various exemplary embodiments of the present disclosure, the server 10 may allocate a higher first weight to each of the first vehicles as the SoC is lower, allocate a higher second weight to each of the first vehicles as the next reservation time according to the reservation information is earlier, and determine a charge order among the plurality of first vehicles based on the first weight and the second weight.

For example, as shown in FIG. 8, the server 10 may allocate a higher first weight to each of the first vehicles as the SoC is lower, allocate a higher second weight to each of the first vehicles as the next reservation according to the reservation information is earlier, and determine that the plurality of first vehicles (e.g., vehicle numbers 5, 13, and 9) corresponding to the number of first chargers (e.g., 3) in the highest order of the sum of the first weight and the second weight are the second vehicles which are the vehicles to be charged. At the instant time, the server 10 may determine that the remaining vehicle (e.g., vehicle number 8) excluding the second vehicle among the plurality of first vehicles is the third vehicle which is a general parking target.

FIG. 9 is a view for describing a case in which the server 10 according to an exemplary embodiment informs the drivers of a connection to the charger or general parking.

Referring to FIG. 9, the server 10 according to various exemplary embodiments of the present disclosure may control the communicator 110 to transmit a message, which informs a connection to the charger, to at least one of the second vehicle to be charged among the plurality of first vehicles and the user terminal 30 of the driver of the second vehicle based on the determined charge order.

The server 10 according to various exemplary embodiments of the present disclosure may control the communicator 110 to transmit a message, which informs general parking, to at least one of the third vehicle which is not the charge target among the plurality of first vehicles and the user terminal 30 of the driver of the third vehicle based on the determined charge order.

Hereinafter, an exemplary embodiment of a method of controlling the server 10 according to one aspect will be described. The server 10 according to the above-described embodiment may be used in the method of controlling the server 10. Therefore, the contents described above with reference to FIG. 1, FIG. 2, FIG. 3, FIG. 4, FIG. 5, FIG. 6, FIG. 7, FIG. 8 and FIG. 9 may be applied to the method for controlling the server 10 in a same manner.

Figure 10A:
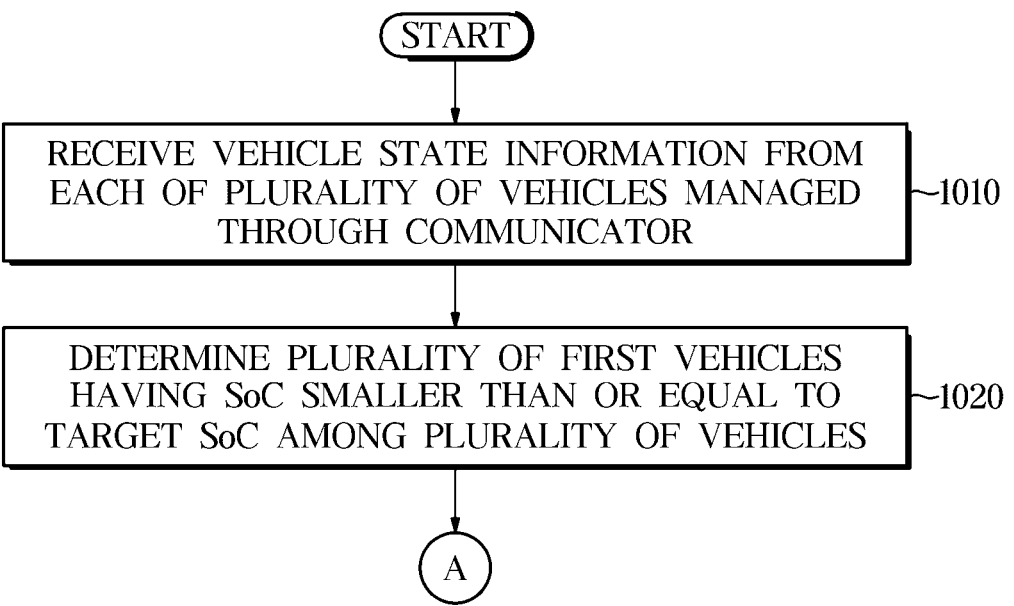
FIG. 10A and FIG. 10B are flowcharts of a case of determining a charge order among vehicles requiring charging in a method of controlling the server according to an exemplary embodiment of the present disclosure.
Figure 10B:
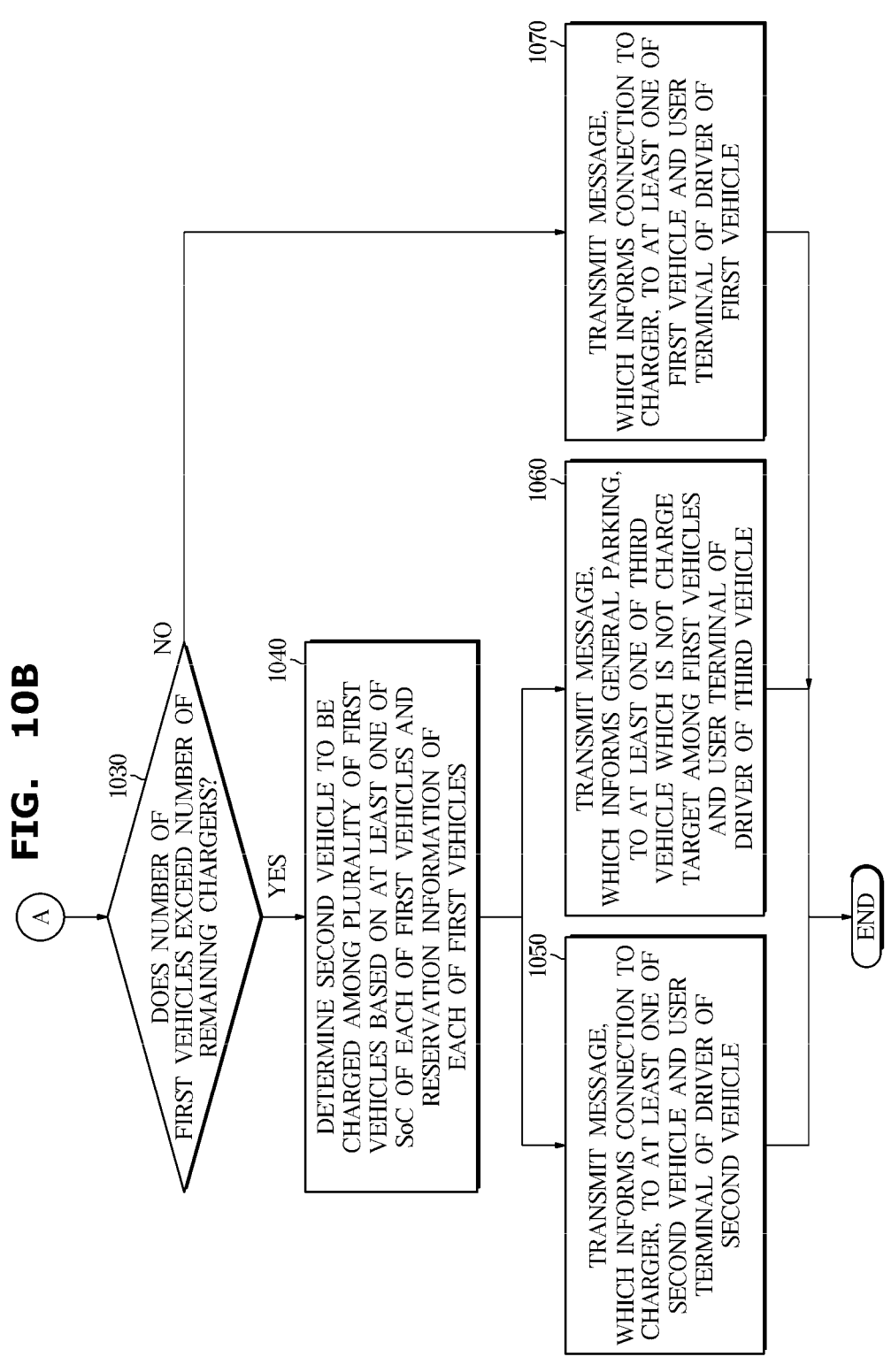

FIG. 10A and FIG. 10B are flowcharts of a case of determining a charge order among the vehicles requiring charging in the method of controlling the server 10 according to an exemplary embodiment of the present disclosure.

Referring to FIG. 10A and FIG. 10B, the server 10 according to various exemplary embodiments of the present disclosure may receive vehicle state information from each of the vehicles 20 being managed through the communicator 110 (1010).

In the instant case, the vehicle state information may include at least one of SoC information and usage state information, wherein the SoC information may indicate an SOC value of a battery of the vehicle 20, and the usage state information may indicate whether a corresponding vehicle 20 is driving, parking, or participating in V2G (in a state of being connected to the charger).

The server 10 according to various exemplary embodiments of the present disclosure may determine a plurality of first vehicles including an SoC lower than or equal to the target SoC among the plurality of vehicles 20 (1020).

In other words, the server 10 may determine vehicles (the first vehicles) requiring charging among the plurality of vehicles 20 based on the SoC information of the vehicle state information.

When the number of the first vehicles exceeds the number of remaining chargers (Yes in 1030), the server 10 according to various exemplary embodiments of the present disclosure may determine second vehicles to be charged among the plurality of first vehicles based on at least one of the SoC information of each of the first vehicles and the reservation information of each of the first vehicles (1040).

For example, the server 10 may determine that only a plurality of vehicles corresponding to the number of first chargers in the chargeable state among the plurality of first vehicles requiring charging are the second vehicles which are the vehicles to be charged and determine that the vehicles excluding the second vehicles among the plurality of first vehicles are third vehicles which are general parking targets.

At the present time, according to the exemplary embodiment of the present disclosure, the server 10 may determine a charge order among the plurality of first vehicles so that the lower the SoC is, the higher the charge order is.

Furthermore, in various exemplary embodiments of the present disclosure, the server 10 may determine a charge order among the plurality of first vehicles so that the earlier the next reservation time according to the reservation information, the higher the charge order.

Furthermore, in various exemplary embodiments of the present disclosure, the server 10 may allocate a higher first weight to each of the first vehicles as the SoC is lower, allocate a higher second weight to each of the first vehicles as the next reservation time according to the reservation information is earlier, and determine a charge order among the plurality of first vehicles based on the first weight and the second weight.

The server 10 according to various exemplary embodiments of the present disclosure may transmit a message, which informs a connection to the charger, to at least one of the second vehicle and the user terminal 30 of the driver of the second vehicle (1050).

Furthermore, the server 10 according to various exemplary embodiments of the present disclosure may transmit a message, which informs general parking, to at least one of the third vehicle which is not the charge target among the first vehicles and the user terminal 30 of the driver of the third vehicle (1060).

Furthermore, when the number of the first vehicles does not exceed the number of the remaining chargers (No in 1030), the server 10 according to various exemplary embodiments of the present disclosure may transmit a message, which informs a connection to the charger, to at least one of the first vehicle and the user terminal 30 of the driver of the first vehicle (1070).

In other words, when the number of the remaining chargers are more than the number of the vehicles 20 requiring charging, the server 10 may inform all vehicles 20 requiring charging of a connection to the charger.

At the present time, in various exemplary embodiments of the present disclosure, the server 10 may control the communicator 110 to transmit a message, which informs a connection to the charger, to at least one of the returning vehicle returning to the parking space where the plurality of chargers are provided among the plurality of first vehicles and the user terminal 30 of the driver of the returning vehicle.

In other words, when the vehicle 20 requiring charging returns to the parking space where the charger is provided, the server 10 may inform the driver of the returning vehicle 20 of the connection to the charger.

Meanwhile, the disclosed exemplary embodiments of the present disclosure may be implemented in the form of a recording medium for storing instructions executable by a computer. The instructions may be stored in the form of program code, and may generate program modules to perform operations of the disclosed exemplary embodiments when executed by a processor. The recording medium may be implemented as a computer-readable recording medium.

Computer-readable recording media includes all types of recording media in which instructions readable by the computer are stored. For example, there may be read only memories (ROMs), random access memories (RAMs), magnetic tapes, magnetic discs, flash memories, optical data storages, and the like.

In according with a server and a method of controlling a same according to one aspect, it is possible to improve charging and management efficiency of vehicles by determining a charge order among the vehicles requiring charging based on at least one of SoC information and reservation information in the case of insufficient chargers for vehicles wand informing the charge order.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A server comprising:
   a communicator configured to communicate with a plurality of vehicles and a plurality of chargers; and
   a controller operatively connected to the communicator and configured to determine a charge order among a plurality of first vehicles based on at least one of state of charge (SoC) information of each of the first vehicles and reservation information of each of the first vehicles, based on a number of the first vehicles including an SoC lower than or equal to a target SoC among the vehicles, which is greater than a number of first chargers in a chargeable state among the chargers,
   wherein the controller is configured to allocate a higher first weight, as the SoC is lower to each of the first vehicles, and allocate a higher second weight, as a next reservation time according to the reservation information is earlier, to each of the first vehicles.

2. The server of claim 1, wherein the controller is configured to determine the charge order among the first vehicles so that the lower the SoC is, the higher the charge order is.

3. The server of claim 1, wherein the controller is configured to determine the charge order among the first vehicles so that the earlier the next reservation time according to the reservation information is, the higher the charge order is.

4. The server of claim 1, wherein the controller is configured to determine the charge order among the first vehicles based on the first weight and the second weight.

5. The server of claim 1, wherein the controller is configured to control the communicator to transmit a message, which informs a connection to the chargers, to at least one of a second vehicle to be charged among the first vehicles based on the determined charge order and a user terminal of a driver of the second vehicle.

6. The server of claim 1, wherein the controller is configured to control the communicator to transmit a message, which informs general parking, to at least one of a third vehicle which is not a charge target among the first vehicles based on the determined charge order and a user terminal of a driver of the third vehicle.

7. The server of claim 1,
   wherein the controller is configured to determine the first vehicles among the vehicles based on vehicle state information of each of the vehicles received through the communicator; and
   wherein the vehicle state information includes at least one of the SoC information and usage state information.

8. The server of claim 7, wherein the controller is configured to determine at least one fourth vehicle connected to the chargers among the vehicles based on the usage state information of each of the vehicles, and determine the number of the first chargers in the chargeable state based on a number of the chargers and a number of the at least one fourth vehicle.

9. The server of claim 1, wherein the controller is configured to control the communicator to transmit a message, which informs a connection to the chargers, to at least one of the first vehicles and user terminals of drivers of the first vehicles based on the number of the first vehicles which is smaller than the number of the first chargers.

10. The server of claim 9, wherein the controller is configured to control the communicator to transmit a message, which informs a connection to the chargers, to at least one of a returning vehicle returning to a parking space where the chargers are provided among the first vehicles and a user terminal of a driver of the returning vehicle.

11. A method of controlling a server including a communicator configured to communicate with a plurality of vehicles and a plurality of chargers and a controller operatively connected to the communicator, the method comprising:

determining, by the controller, a charge order among a plurality of first vehicles based on at least one of state of charge (SoC) information of each of the first vehicles and reservation information of each of the first vehicles based on a number of the first vehicles including an SoC lower than or equal to a target SoC among the vehicles, which is greater than a number of first chargers in a chargeable state among the chargers, wherein the determining of the charge order includes allocating a higher first weight, as the SoC is lower, to each of the first vehicles, and allocating a higher second weight, as a next reservation time according to the reservation information is earlier, to each of the first vehicles.

12. The method of claim 11, wherein the determining of the charge order among the first vehicles includes determining the charge order among the first vehicles so that the lower the SoC is, the higher the charge order is.

13. The method of claim 11, wherein the determining of the charge order among the first vehicles includes determining the charge order among the first vehicles so that the earlier the next reservation time according to the reservation information is, the higher the charge order is.

14. The method of claim 11, wherein the determining of the charge order among the first vehicles includes:

determining the charge order among the first vehicles based on the first weight and the second weight.

15. The method of claim 11, further including:

controlling, by the controller, the communicator to transmit a message, which informs a connection to the chargers, to at least one of a second vehicle to be charged among the first vehicles based on the determined charge order and a user terminal of a driver of the second vehicle.

16. The method of claim 11, further including:

controlling, by the controller, the communicator to transmit a message, which informs general parking, to at least one of a third vehicle which is not a charge target among the first vehicles based on the determined charge order and a user terminal of a driver of the third vehicle.

17. The method of claim 11, further including:

determining, by the controller, the first vehicles among the vehicles based on vehicle state information of each of the vehicles received through the communicator, wherein the vehicle state information includes at least one of the SoC information and usage state information.

18. The method of claim 17, further including:

determining, by the controller, at least one fourth vehicle connected to the chargers among the vehicles based on the usage state information of each of the vehicles; and determining, by the controller, the number of the first chargers in the chargeable state based on a number of the chargers and a number of the at least one fourth vehicle.

19. The method of claim 11, further including:

controlling, by the controller, the communicator to transmit a message, which informs a connection to the chargers, to at least one of the first vehicles and user terminals of drivers of the first vehicles based on the number of the first vehicles which is smaller than the number of the first chargers.

20. The method of claim 19, wherein the controlling of the communicator to transmit the message, which informs the connection to the chargers, includes controlling the communicator to transmit a message, which informs a connection to the chargers, to at least one of a returning vehicle returning to a parking space where the chargers are provided among the first vehicles and a user terminal of a driver of the returning vehicle.

* * * * *